United States Patent [19]

Cotton

[11] 4,381,459
[45] Apr. 26, 1983

[54] POWER-UP CIRCUIT FOR MICROPROCESSOR BASED APPLIANCE CONTROL

[75] Inventor: Curran D. Cotton, Newton, Iowa

[73] Assignee: The Maytag Company, Newton, Iowa

[21] Appl. No.: 305,559

[22] Filed: Sep. 25, 1981

[51] Int. Cl.³ ............................................. H01H 3/00
[52] U.S. Cl. .................................................... 307/139
[58] Field of Search ........................ 307/86, 139, 142; 364/707

[56] References Cited

U.S. PATENT DOCUMENTS

| | | | |
|---|---|---|---|
| 4,001,599 | 1/1977 | Karklys | 307/141 |
| 4,079,366 | 3/1978 | Wong | 340/309.4 |
| 4,195,232 | 3/1980 | Marcade | 307/130 |
| 4,227,098 | 10/1980 | Brown et al. | 307/311 |

Primary Examiner—Michael L. Gellner
Assistant Examiner—T. DeBoer
Attorney, Agent, or Firm—Richard L. Ward

[57] ABSTRACT

A power-up circuit is provided for a microprocessor based appliance control which includes a power source providing power between first and second conductors. A first circuit is connected across the conductors and a second circuit is electrically disconnected from one of the conductors and from the power source by a normally open switch. The second circuit includes a microprocessor control and the first circuit includes a relay coil for controlling the normally open switch. An optically coupled solid state relay couples the first and second circuits through a pair of light actuated silicon controlled rectifiers in the first circuit for energizing the relay coil and a pair of light emitting diodes in the second circuit for illuminating the light actuated silicon controlled rectifiers. A touch switch and related components are associated with the first circuit and are responsive to manual actuation of the touch switch to initiate energization of the relay coil independent of the light emitting diodes to effect closing of the normally open switch and connection of the second circuit to the power source. After this connection, the light emitting diodes will emit light to illuminate the silicon controlled rectifiers and maintain the relay coil in an energized posture until the cycle is terminated through the microprocessor control.

10 Claims, 2 Drawing Figures

POWER-UP CIRCUIT FOR MICROPROCESSOR BASED APPLIANCE CONTROL

BACKGROUND OF THE INVENTION

This invention relates generally to the field of control circuitry for appliances and more particularly to a circuit for powering-up a microprocessor based control.

Prior art microprocessor control circuits have generally required that the microprocessor be either in a power-on state at all times or be selectively powered up by the operator through an electromechanical switch. Generally, a system which is in a power-on state at all times is in a constantly stressed condition and is more susceptible to damaging line transients than a system which is electrically isolated from the power line.

Wong, U.S. Pat. No. 4,079,366 is an example of a circuit operable for maintaining the microprocessor in a power-on state at all times. In this type of a control a time of day clock is generally operated by the microprocessor control.

Marcade, in U.S. Pat. No. 4,195,232, discloses an on-off switch which projects through the control panel and is manually operable by the appliance user for providing power to the microprocessor control.

Prior art has shown microprocessor control circuits which are powered full time and circuits which are manually operated between an on and an off condition. Also shown has been the use of light emitting diodes and photo diodes to achieve electrical isolation of portions of the circuit. There has been no showing, however, of the use of an optocoupler in conjunction with a microprocessor control for achieveing selective energization of the microprocessor control through a touch-on membrane switch while maintaining electrical isolation between the touch-on membrane switch and the microprocessor control.

SUMMARY OF THE INVENTION

It is therefore an object of the instant invention to provide an improved control circuit for powering-up a microprocessor based appliance control.

It is a further object of the instant invention to provide a touch actuated appliance control which permits the use of a smooth continuous control panel face.

It is a still further object of the instant invention to provide a circuit which eliminates electromechanical power-on devices.

It is another object of the instant invention to provide circuitry which achieves electrical isolation of the power-up circuit from the microprocessor control.

It is still another object of the instant invention to provide a control which does not require a power-on state at all times.

Briefly, the instant invention achieves these objects in a power-up circuit for a microprocessor based appliance control. The circuit includes a power source providing power between first and second conductors, a first circuit portion connected across the conductors and a second circuit portion including a microprocessor control. The second circuit portion is electrically disconnected from one of the conductors and from the power source by a normally open switch with the first circuit portion including a relay coil for controlling the normally open switch. Circuitry is provided for operatively coupling the first and second circuit portions including a light actuated member in the first circuit portion for energizing the relay coil and a light emitting member in the second circuit portion for illuminating the light actuated member. The circuitry further includes a touch switch responsive to manual actuation for energizing the relay coil independently of the light emitting member to effect initial closing of the normally open switch and connection of the second circuit portion to the power source. The light emitting member is operable upon power-up of the second circuit portion to the power source for emitting light and maintaining the light actuated member operable for energizing the relay coil. Circuitry is connected to the microprocessor control for controlling operation of the light emitting member responsive to the microprocessor control.

Operation of the circuit and further objects and advantages thereof wil become evident as the description proceeds and from an examination of the accompanying sheet of drawings.

BRIEF DESCRIPTION OF THE DRAWINGS

The drawings illustrate a preferred embodiment of the invention with similar numerals referring to similar parts throughout the several views, wherein.

DESCRIPTION OF A PREFERRED EMBODIMENT

Figure 1:
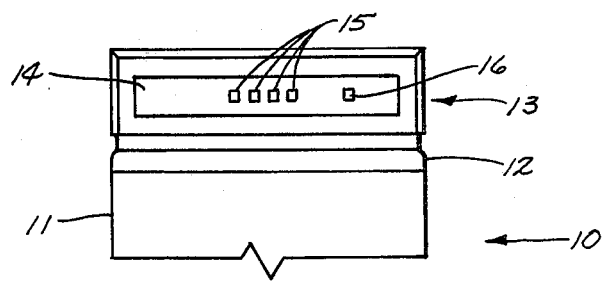
FIG. 1 is a partial front elevation view of an appliance including a touch actuated control panel.

Referring now to the drawings and in particular to FIG. 1, there is shown a free standing appliance 10 having a cabinet 11 and a top cover 12. Extending upwardly from the top cover 12 is a control housing 13 for mounting various control members. In a preferred embodiment the control housing 13 comprises a unitary smooth membrane surface 14 having a plurality of cycle selection touch switches 15 and a touch-on switch 16 incorporated therein. The touch switches 15 and 16 are operable to closed postures by an operator depressing the membrane surface 14 only a few thousandths of an inch to make contact.

Figure 2:
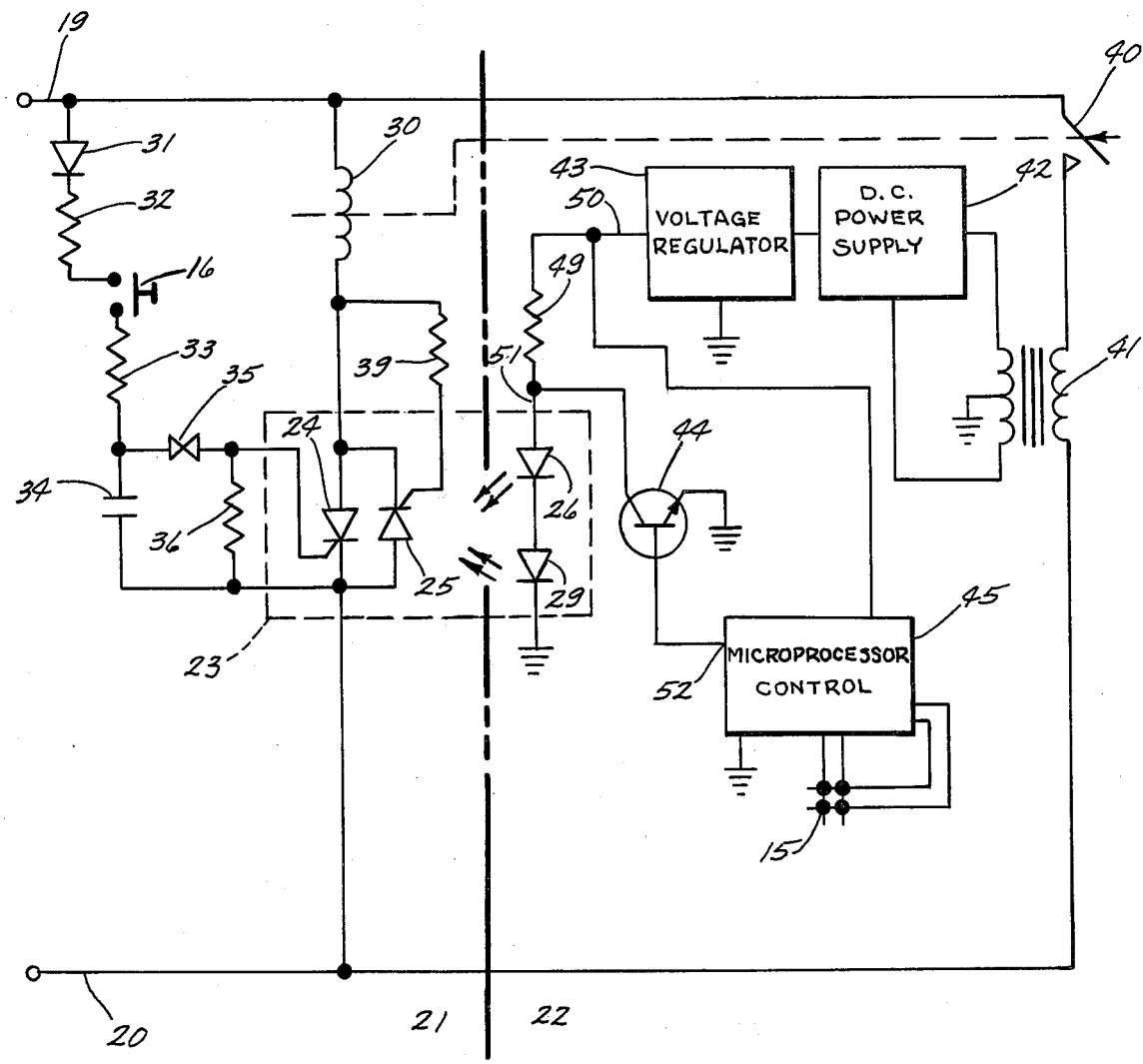
FIG. 2 is a schematic diagram of the appliance power-up circuit.

Turning to FIG. 2, there is shown an electrical circuit for energizing or powering-up the appliance 10. The electrical circuit includes a source of 120 volts RMS alternating current through the conductors 19 and 20. Connected across the conductors 19 and 20 of the 120 volt RMS source are two electrically separate and distinct electrical circuit portions 21 and 22 are generally divided by the vertical phantom line of FIG. 2.

The first electrical circuit portion 21 includes one circuit leg having the light actuatable portion of a Monsanto MCS 6200 optically isolated solid state relay 23. The MCS 6200 solid state relay 23 includes, in one package, a pair of light actuated silicon controlled rectifiers or SCR's 24 and 25, connected in parallel and a pair of light emitting diodes or LED's 26 and 29, connected in series and energizable for emitting light to illuminate and actuate the SCR's 24 and 25. Connected in series with the parallel SCR's 24 and 25 across the conductors 19 and 20 of the 120 volt RMS power supply is a power relay 30 which is energized through SCR's 24 and 25 when they are in a conductive condition.

The first electrical circuit portion 21 further includes a second circuit leg in parallel with the first circuit leg. This second circuit leg includes, in a series connection, a diode 31, a resistor 32, the touch-on switch 16, a resistor 33, and a capacitor 34. Connected between the junction of the resistor 33 and capacitor 34 and the gate of SCR 24 in the solid state relay 23 is a diac 35. Other "breakover" devices such as a neon lamp could also be used instead of the diac 35. Resistors 36 and 39 of the first circuit portion are connected across the gate and cathode of silicon controlled rectifiers 24 and 25 respectively to protect them from falsely triggering due to current transients in the circuit.

The second circuit portion 22 includes a normally open switch 40 which is operable to a closed posture by the power relay 30 when the first circuit portion 21 is energized. When the normally open switch 40 is closed through the power relay 30 by energizing SCR 24 through the diac 35 the second circuit portion 22 is connected across the conductors 19 and 20 of the 120 volt RMS power supply and energized.

Also included in the second circuit portion 22 is a step-down transformer 41, a direct current power supply 42, a voltage regulator 43, the LED's 26 and 29 of the MCS 6200 solid state relay 23, a transistor 44 and a microprocessor control 45. The step-down transformer 41 develops 18 volts RMS across the secondary winding. The direct current power supply 42 in turn develops a direct current voltage which is regulated to 5 volts by the voltage regulator 43 to provide stable operating power for the microprocessor control 45 and the MCS 6200 solid state relay 23. The second circuit portion 22 is electrically isolated from the first circuit portion 21 at all times but is optically coupled thereto through the MCS 6200 solid state relay 23.

The microprocessor control 45 can be any one of a vast number of controllers on the market today. In this embodiment a National Semiconductor COPS 420/421 N-channel microcontroller is utilized. Cycle selection touch switches 15 are provided as part of the appliance membrane surface 14 to interface the microprocessor control 45 with the appliance control housing 13.

A resistor 49, is placed in series with the output 50 of the voltage regulator 43 and the input 51 of the LED's 26 and 29 of the solid state relay 23. This resistor 49 limits the current through the LED's 26 and 29.

The transistor 44, has its collector lead connected to the junction of resistor 49 and the anode of LED 26 and its base connected to the serial output terminal 52 of the microprocessor control 45. The emitter lead of the transistor 46 is connected to ground or common. The function of the transistor 46 will be further discussed herein.

The microprocessor control 45 is powered-up by the operator momentarily closing the contacts of the touch-on switch 16 at the membrane surface 14. Closing the touch-on switch 16 allows unidirectional current to flow through the diode 31, resistor 32, the touch-on switch 16 and through resistor 33 to charge the capacitor 34. The resistor 32 is selected to limit the current at the touch-on switch 16 to be within the requirements of various appliance testing agencies. The capacitor 34 is charged through resistor 33 until it attains sufficent voltage to break down the diac 35 forcing it into conduction. At this time, capacitor 34 discharges through the gate to cathode circuit of SCR 24, switching it into conduction. Silicon controlled rectifier 24 will then initially energize the power relay 30 during the positive half-wave of the 120 volt RMS power supply.

When the power relay 30 is energized, it will effect the closing of the normally open switch 40. Closing of the normally open switch 40 energizes the step-down transformer 41, the direct current power supply 42, the voltage regulator 43 and the COPS 420/421 microprocessor control 45. Connected across the output of the voltage regulator 43 is the series combination consisting of resistor 49 and LED's 26 and 29. As previously indicated, the LED's 26 and 29 are an integral part of the MCS 6200 solid state relay 23. The solid state relay 23 is latched into conduction as follows: Once the power relay 30 has caused the normally open switch 40 to close, the solid state relay 23 remains in conduction since the voltage regulator 43 provides a potential which creates current flow through the resistor 49 and the LED's 26 and 29 to establish an optical coupling between the LED's 26 and 29 and the SCR's 24 and 25. The touch-on switch 16 can now be opened by the operator removing his finger from the membrane surface 14 and the diac 35 will no longer provide a pulse to the SCR 24. The optical connection between the LED's 26 and 29 and the SCR's 24 and 25 will maintain conduction of the SCR's 24 and 25. It is thus seen that once the power relay 30 is energized the normally open switch 40 will be closed to energize the step-down transformer 41 which energizes the direct current power supply 42. The direct current power supply 42 energizes the voltage regulator 43 which furnishes current for the LED's 26 and 29 of the solid state relay 23. The LED's 26 and 29 illuminate the SCR's 24 and 25 within the solid state relay 23 to keep them in conduction and continue to hold the power relay 30 closed.

It is noted that for the LED's 26 and 29 to be energized, transistor 44 must be in a non-conducting state or else the current through the LED's 26 and 29 would be shunted to the ground or common connection through the relatively low impedence path of conducting transistor 44. For transistor 44 not to conduct, the serial output terminal 52 of the microprocessor control 45 must be configured in a logic 0 condition. As the voltage regulator 43 is powered up by the direct current power supply 42, it furnishes a 5 volt potential to the microprocessor control 45. The microprocessor control 45 then begins to run its initialization program and in so doing creates a logic 0 at the serial output terminal 52.

When the appliance cycle is to be terminated, the microprocessor program causes the serial output terminal 52 to become a logic 1. This will place a positive voltage between the base of transistor 44 and the common or ground connection and transistor 44 will switch into conduction. When transistor 44 conducts current, the current flow through LED's 26 and 29 will cease and the optical coupling between the LED's 26 and 29 and the SCR's 24 and 25 within the solid state relay 23 will be broken. Breaking of this optical coupling causes both SCR's 24 and 25 to cease conduction and the power relay 30 will be deenergized. As the power relay 30 is deenergized, the normally open switch 16 will return to the normally open position and deenergize the step-down transformer 41. When the step-down transformer 41 is deenergized, the direct current power supply 42 is no longer energized and the entire direct current system is deenergized. However, the touch-on switch 16 and associated electronics remains connected across the 120 volt RMS line and remains operable for initiating a predetermined cycle of events.

The circuit herein described thus permits the use of a completely smooth membrane surface 14 at the control housing 13. The circuitry also eliminates any mechanical power-on devices and achieves electrical isolation of the power-up circuit from the microprocessor control 45. Isolation of the microprocessor control 45 is achieved without requiring that the microprocessor control 45 be in a full time powered-up condition and without the use of a mechanical on-off switch.

In the drawings and specification there is set forth a preferred embodiment of the invention and through specific terms are employed these are used in a generic and descriptive sense only and not for purposes of limitation. Changes in the form and proportion of parts as well as the substitution of equivalents are contemplated as circumstances may suggest or render expedient without departing from the spirit or scope of this invention as defined in the following claims.

I claim:

1. A power-up circuit for a microprocessor based appliance control, the combination comprising: a power source providing power between first and second conductors; a first circuit portion connected across said conductors; a second circuit portion electrically disconnected from one of said conductors and from said power source by a normally open switch means and including a microprocessor control, said first circuit portion including means for controlling said normally open switch means; means for operatively coupling said first and second circuit portions including light actuated means in said first circuit portion for energizing said means for controlling and further including light emitting means in said second circuit portion for illuminating said light actuated means; means including a touch switch responsive to manual actuation for energizing said means for controlling independently of said light emitting means to effect initial closing of said normally open switch means and connection of said second circuit portion to said power source, said light emitting means being operable upon connection of said second circuit portion to said power source for emitting light to maintain said light actuated means operable for energizing said means for controlling; and means connected to said microprocessor control for controlling operation of said light emitting means responsive to said microprocessor control.

2. A power-up circuit as defined in claim 1 wherein said means for controlling further includes a relay coil.

3. A power-up circuit as defined in claim 1 wherein said light actuated means includes at least one light actuated silicon connected rectifier operable for energizing said means for controlling.

4. A power-up circuit as defined in claim 3 wherein said light emitting means includes at least one light emitting diode operable for illuminating and energizing said light actuated silicon controlled rectifier to effect energization of said means for controlling.

5. A power-up circuit as defined in claim 1 wherein said means for operatively coupling includes an optically isolated solid state relay for effectively electrically isolating and operatively coupling said first and second circuit portions.

6. A power-up circuit as defined in claim 1 wherein said means including a touch switch further includes a semiconductor device for electrically energizing said means for controlling through said light actuated means.

7. A power-up circuit for a microprocessor based appliance control, the combination comprising: a power source for providing power between first and second conductors; a first circuit portion connected across said pair of conductors; a second circuit portion electrically disconnected from one of said conductors and from said power source by a normally open switch and including a microprocessor control, said first circuit portion including a relay coil for controlling said normally open switch; an optically coupled solid state relay for operatively coupling said first and second circuit portions including a pair of light actuated silicon controlled rectifiers in said first circuit portion for energizing said relay coil and a pair of light emitting diodes in said second circuit portion for illuminating said light actuated silicon controlled rectifiers; means for initiating a cycle of operations including a touch switch associated with said first circuit portion and responsive to manual actuation for energizing said relay coil independently of said light emitting diodes to effect initial closing of said normally open switch and connection of said second circuit portion to said power source, said light emitting diodes being operable upon connection of said second circuit portion to said power source for emitting light to maintain said light actuated silicon controlled rectifiers operable for energizing said relay coil; and switching means connected to said microprocessor control for controlling operation of said light emitting diodes responsive to said microprocessor control.

8. A power-up circuit as defined in claim 7 wherein said means for initiating a cycle of operations includes a semiconductor triggering device operable for effecting said indepedent operation of said relay coil.

9. A power-up circuit as defined in claim 7 wherein said switching means includes a semiconductor device operable under control of said microprocessor control for conducting current to deenergize said light emitting diodes.

10. A power-up circuit as defined in claim 7 wherein said solid state relay is operable for effecting electrical isolation while maintaining an operative coupling of said first and second circuit portions through said light emitting means and said light actuating means.

* * * * *